United States Patent
Gouldieff et al.

(10) Patent No.: US 10,848,357 B2
(45) Date of Patent: Nov. 24, 2020

(54) METHOD FOR ESTIMATING PARAMETERS OF SIGNALS CONTAINED IN A FREQUENCY BAND

(71) Applicant: Zodiac Data Systems, Courtaboeuf (FR)

(72) Inventors: Vincent Gouldieff, Rennes (FR); Steredenn Daumont, Bretteville-l'Orgueilleuse (FR); Jacques Palicot, Rennes (FR); Yann Thomas, Caen (FR)

(73) Assignee: Zodiac Data Systems (FR)

( * ) Notice: Subject to any disclaimer, the term of this patent is extended or adjusted under 35 U.S.C. 154(b) by 136 days.

(21) Appl. No.: 16/074,972

(22) PCT Filed: Feb. 3, 2017

(86) PCT No.: PCT/EP2017/052396
§ 371 (c)(1),
(2) Date: Aug. 2, 2018

(87) PCT Pub. No.: WO2017/134233
PCT Pub. Date: Aug. 10, 2017

(65) Prior Publication Data
US 2019/0044767 A1    Feb. 7, 2019

(30) Foreign Application Priority Data
Feb. 5, 2016    (FR) ...................... 16 50945

(51) Int. Cl.
*H04L 27/00*    (2006.01)
*H04L 27/26*    (2006.01)

(52) U.S. Cl.
CPC ...... *H04L 27/0012* (2013.01); *H04L 27/2601* (2013.01)

(58) Field of Classification Search
None
See application file for complete search history.

(56) References Cited

U.S. PATENT DOCUMENTS

| | | | | |
|---|---|---|---|---|
| 7,486,747 B1 * | 2/2009 | Bagley | ................ | H04B 1/7093 375/324 |
| 2005/0278171 A1 * | 12/2005 | Suppappola | .......... | G10L 19/012 704/227 |

(Continued)

OTHER PUBLICATIONS

Rebeiz and Cabric, "Low Complexity Feature-based Modulation Classifier and its Non-Asymptotic Analysis", InGlobal Telecommunications Conference (GLOBECOM 2011), Dec. 5, 2011, pp. 1-5.

(Continued)

*Primary Examiner* — Noel R Beharry
*Assistant Examiner* — Liem H. Nguyen
(74) *Attorney, Agent, or Firm* — Lerner, David, Littenberg, Krumholz & Mentlik, LLP

(57) ABSTRACT

A method for estimating parameters of a single signal or mixed-frequency signals in a given frequency band comprises: receiving the signal(s); calculating a spectral correlation function having variables f and α (cyclic frequency) for different values of L taken from a set of q strictly positive values, where, for each q, α can independently take on one or more discrete values and/or cover one or more value ranges; from each calculation, extracting a set of local maxima detected on the basis of the variables f and α or on the basis of variable f for each discrete value of α, each of said peaks being characterized by a triplet [$LAp_i$, $LFp_i$, $L\alpha p_i$], $LFp_i$ and $L\alpha p_i$ being the frequency and cyclic frequency of said triplet, respectively, and $LAp_i$ being the amplitude; and identifying groups of triplets as being the signature left by a set of parameters making up the signal(s).

11 Claims, 2 Drawing Sheets

(56) References Cited

U.S. PATENT DOCUMENTS

Figure 1:
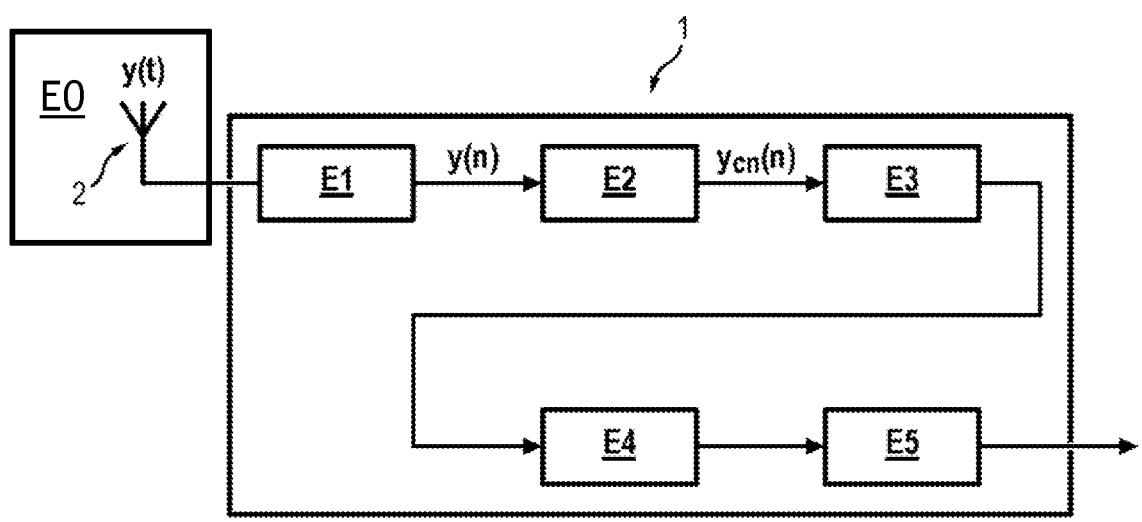

| | | | |
|---|---|---|---|
| 2010/0023990 A1* | 1/2010 | Chen | H04L 27/0012 725/118 |
| 2011/0085612 A1* | 4/2011 | Muraoka | H04W 16/14 375/260 |
| 2012/0094618 A1* | 4/2012 | Harada | H04L 27/0006 455/84 |
| 2013/0045703 A1* | 2/2013 | Kommate | H04B 17/26 455/226.1 |
| 2014/0064114 A1* | 3/2014 | Wang | H04L 27/0006 370/252 |
| 2018/0123633 A1* | 5/2018 | Gravely | H04B 1/1027 |

OTHER PUBLICATIONS

Wu and Yang, "Blind Cyclostationary Carrier Frequency and Symbol Rate Estimation for Underwater Acoustic Communication", InCommunications (ICC), 2012 IEEE International Conference, Jun. 10, 2012, pp. 3482-3486.

Ramkumar, Barathram, "Automatic Modulation Classification for Cognitive Radios Using Cyclic Feature Detection", IEEE Circuits and Systems Magazine, Jun. 2009, vol. 9, No. 2, pp. 27-45.

French Preliminary Search Report for FR1650945 dated Sep. 28, 2016.

International Search Report for PCT/EP2017/052396 dated Apr. 7, 2017.

Swami and Sadler, "Hierarchical Digital Modulation Classification Using Cumulants", IEEE Transactions on Communications, vol. 48, No. 3, Mar. 2000, pp. 416-429.

Reichert, J., "Automatic Classification of Communication Signals Using Higher Order Statistics", Inicassp, Mar. 1992, pp. 221-224.

Mazo, J.E., "Jitter Comparison of Tones Generated by Squaring and by Fourth-Power Circuits", Bell System Technical Journal, vol. 57, No. 5, May 1978, pp. 1489-1498.

Guenther, B.E., "Multi-User Signal Classification via Cyclic Spectral Analysis", Doctoral Dissertation, Wright State University, Department of Electrical Engineering, Oct. 2010, 81 pages.

Zaerin and Seyfe, "Multiuser Modulation Classification Based on Cumulants in Additive White Gaussian Noise Channel", IET Signal Processing, vol. 6, No. 9, Dec. 2012, pp. 815-823.

Proakis, John G. & Masoud Salehi, "Chapter 4.4: Power Characteristics of Digitally Modulated Signals" and "Chapter 6: An Introduction to Information Theory" in Digital Communications 5th Edition, McGraw-Hill Publishers, 2007,New York, pp. 203-210 and 330-399.

\* cited by examiner

METHOD FOR ESTIMATING PARAMETERS OF SIGNALS CONTAINED IN A FREQUENCY BAND

CROSS-REFERENCE TO RELATED APPLICATIONS

The present application is a national phase entry under 35 U.S.C. § 371 of International Application No. PCT/EP2017/052396, filed Feb. 3, 2017, published as International Publication No. WO 2017/134233 A1, which claims priority from French Patent Application No. 1650945, filed Feb. 5, 2016, all of which are incorporated herein by reference.

GENERAL TECHNICAL FIELD

The invention relates to the field of telecommunications and especially the field of systems and methods for estimating some parameters constituting one or more modulated signals or carriers contained in the same frequency band.

STATE OF ART

The multiplication of telecommunications systems is creating a need for reuse of channels to satisfy demand in terms of bandwidth and service quality. Such reuse is possible due to cellular or spot networks.

The densification of these networks associated with reuse of some channels between near or adjacent cells causes situations where a terminal receives a signal of interest tainted by one or more interfering signals the power of which resembles that of the useful signal. According to case this concomitance of signals using the same frequential resource can be involuntary (co-channel interference) or deliberate (prior knowledge of the use of the same frequency by another sender is used to correctly receive telecommunications and optimize use of the spectrum).

The error rate of classic architecture terminals is highly degraded and algorithms of separation or reduction of interferences have to be used to isolate the useful signal.

The knowledge of some characteristics of signals present in the given band is needed for proper operation of these algorithms.

These characteristics are, for example, modulation used, power, carrier frequency or even the symbol rhythm of each of the signals present in the given band.

Methods for estimation of the characteristics of the main signal are known when the interfering signals are of very low relative levels:

For estimation of modulations:

Reference could be made to documents [Swami Et Sadler, 2000] and [Ramkumar, 2009] or also to documents [Reichert, 1992] and [Rebeiz, 2011].

The document [Ramkumar, 2009] exploits usual cyclostationary functions (cyclic autocorrelation function (CAF)), a Spectral Correlation Function (SCF) and a Spectral Coherence Function (SOF), from which characteristics are extracted by a method exploiting only some of the peaks obtained.

The document [Reichert, 1992] is based on the Mth Power nonlinear Transform previously proposed in the document [Mazo, 1978] for estimating the carrier frequency and the symbol rhythm of a signal of interest in the absence of interfering signals.

The document [Rebeiz, 2011] non-blindly extracts peaks of the SOF (the author assumes to know their positions). Also, it exploits the amplitude of peaks only and not their spectral position to conduct classification.

For estimation of other parameters (powers, frequencies carriers, rhythms symbols, etc.):

Reference could be made to the document [Proakis, 2007], and to the document [Wu, 2012]. In this latter document, the author utilises the classic SOF for estimating the symbol rhythm and the carrier frequency of a signal in the absence of interferer.

Other techniques have been put forward for estimation of some parameters when several signals are present in the same frequency band. The latter use transforms in the spectral field or statistics of superior orders. In this respect, for estimation of modulations, reference could be made to:

document [Zaerin & Seyfe, 2012] which presents a method for estimation of modulations based on "cumulatives" of superior orders. This technique is efficacious for estimating the constellations of useful signals and interferers. However, it proves ineffective when the SINR ("Signal to Interference plus Noise Ratio", which defines the ratio between the power of the signal of interest and the combined power of the signal interfere and additive noise) are low, or when the power of the interferer is comparable to that of the signal of interest.

document [Guenther, 2010], wherein a spectral correlation function (SCF) is used for the estimation of characteristics. But the cooperative nature of the method presented (some parameters are known previously) makes its use impossible, since the interfering signals exhibit a high level and no information can be used prior. Also, it does not exploit the values of the amplitude of peaks of the SCF.

Known techniques therefore have many disadvantages.

PRESENTATION OF THE INVENTION

The invention proposes eliminating the abovementioned disadvantages.

For this purpose, the invention proposes a method for estimation of parameters constituting a single signal or mixed-frequency signals constituted by the following steps:

receipt of a single signal or a mixture of signals y(t) in a given frequency band;

determining for L, strictly positive real number taken in a set of q, q strictly positive predetermined values $\{L_1; \ldots ; L_q\}$ of the function of spectral correlation defined hereinbelow:

$$LSCF_y(f, \alpha) \triangleq \sqrt[L]{|\mathcal{F}_\tau[R_{y^L}(\tau, \alpha)](f)|}$$

$$\text{where } R_{y^L}(\tau, \alpha) = \frac{1}{N}\sum_{n=0}^{N} y^L(n)y^{*L}(n-\tau)e^{-j2\pi\alpha n}$$

is the cyclic autocorrelation function of elevation to the power L of the sampled version y(n) of the signal y(t) and where $F_\tau[.]$ is the Fourier transform and where, for each q, α can independently assume one or more discrete values and/or pass through one or more ranges of values;

processing of each transformation LSCFy(f,α) L being taken in a set of q, q strictly positive predetermined values $\{L_1; \ldots ; L_q\}$ to extract therefrom a set of peaks $p_i$, that is, local maxima detected according to the variables f and α or according to the sole variable f for each discrete value of α, each of these peaks being characterized by a triplet $\{LAp_i, LFp_i, L\alpha p_i\}$ where LFp$_i$ and L$\alpha$p$_i$ are respectively the frequency and the cyclic frequency at which it is located and LAp$_i$ its amplitude;

identifying of groups of triplets {LAp$_i$, LFp$_i$, L$\alpha$p$_i$} as being the signature left by a set of parameters constituting signals present in the given frequency band.

In the context of the invention, for real M, it is useful to use the particular case of the function MPT defined as follows:

$$MPT_y(f) \triangleq \sqrt[M]{\mathcal{F}_\tau[r_y^M(\tau)](f)},$$

where F$\tau$[.] is the Fourier transform, r$y$M($\tau$) is the autocorrelation function of elevation to the power M of the sampled signal y(n) which will have optionally been standardized and centred previously. When the order M and the order L are identical, the function MPT corresponds to the function LSCF taken for zero $\alpha$: LSCF$_y$(f,0)=MPT$_y$(f)\L=M. The general formulation using the function LSCF therefore includes the particular case of the function MPT.

When the order M and the order L are identical, the function MPT corresponds to the function LSCF taken for zero $\alpha$: LSCF$_y$(f,0)=MPT$_y$(f)\L=M. The general formulation using the function LSCF includes the particular case of the function MPT.

The identification phase can be based on several methods for classification of the detected peaks. All are based on the intrinsic properties of each function LSCF (respectively MPT) which generates spectral lines characteristics of the mixture, which can accordingly be qualified as signature. The frequencies at which these lines appear are combinations of rhythms and residual carrier frequencies, whereas their amplitude profiles according to the order L (respectively M) of the spectral transformations are mainly a function of the modulations (constellation and shaping filter) and amplitudes of signals of the mixture.

The invention is based on the richness of combinations of observable spectral transformations and the joint exploitation of positions and amplitudes of peaks. In fact, the choice of some orders of transformation (L or M) associated with the possibility of exploring an additional dimension of variable (the cyclic frequency $\alpha$) enables separate determination, without previous knowledge, of parameters constituting the mixture of signals. In particular, the values of interest for L (or M) depend on the possible constellations, and can typically be selected in the set {2, 4, 8} to characterize the most current constellations.

The invention is advantageously completed by the following dispositions, taken alone or in any of their technically possible combinations.

The determining step is conducted first, by considering the cyclic frequency $\alpha$ as being the zero discrete value (specifically the function MPT) for identifying groups of triplets {LAp$_i$, LFp$_i$, L$\alpha$p$_i$=0}, and secondly by selecting a set of values of the order L and of discrete values or of ranges of variation of $\alpha \neq 0$ determined as a function of results of the first application of the method.

The Lth root of the module of the Fourier transform is replaced in the formulas of spectral transformations by any other power or a logarithm or any other real monotonous function of the module of the Fourier transform.

The method also comprises pre-processing of the signal received comprising the following sub-steps:

determining of the spectral density of power of y(n);

processing of the spectral density of power for estimating the level of noise contained in the mixture;

processing of standardization and of centering of the mixture of signals from characteristics previously obtained, the determination of functions LSCF for some values of L taken in {L$_1$, ... L$_q$}, being based on the standardized and centred mixture.

The identification comprises a comparison step of groups of triplets {LAp$_i$, LFp$_i$, L$\alpha$p$_i$} obtained from signatures predetermined in advance, that is, triplets or couples corresponding to a set of assumptions of parameters constituting signals present in the mixture.

The identification allows estimation of modulations and amplitudes of signals executing an algorithm for classification of the peaks according to the frequency at which they are located then search via calculation of parameters constituting the mixture creating signatures reassembling the groups formed in this way.

The estimation of modulations and amplitudes of the mixture of signals executes a search algorithm of maximum probability of peaks obtained using analytical models of signatures and probability of spreads observed.

The estimation of modulations of each of the signals executes an algorithm which searches for the minimum Mean-Squared Error (MSE) between the different triplets or couples and based on signatures previously set up from theoretical or experimental values.

The values of L are selected as a function of modulations present in given telecommunications standards.

The identification allows estimation of the residual carrier frequencies and rhythm symbols from the values LFp$_i$.

The identification allows estimation of the number of signals N$_u$ from the values LFp$_i$.

PRESENTATION OF THE DRAWINGS

Figure 2:
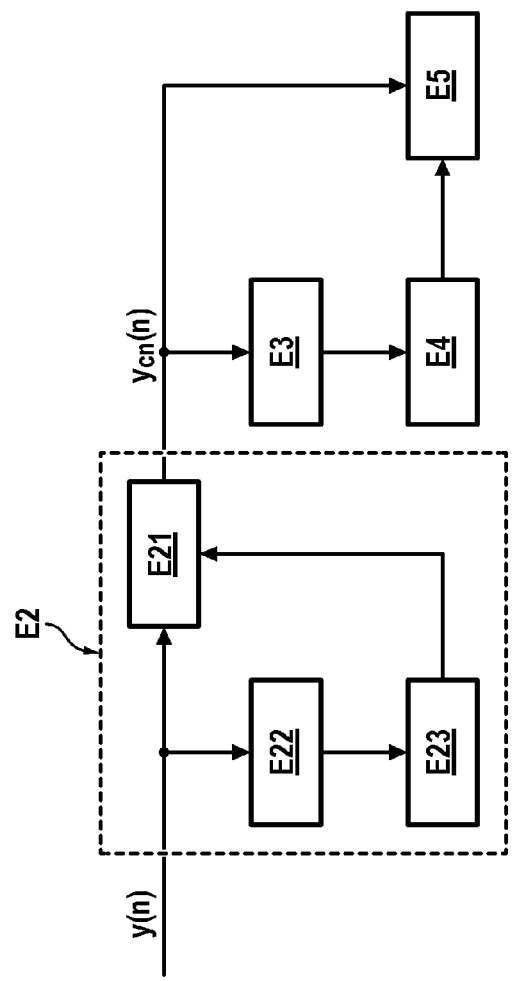

Other characteristics, aims and advantages of the invention will emerge from the following description which is purely illustrative and non-limiting and which must be considered with respect to the appended drawings, in which:

FIG. 1 schematically illustrates steps of a method according to the invention;

FIG. 2 schematically illustrates details of steps of the method of FIG. 1.

In the set of figures similar elements are designated by identical reference numerals.

DETAILED DESCRIPTION OF THE INVENTION

In terms of a method of estimation of parameters constituting one or more signals partially or totally superposed in frequency in a given band, described in relation to FIGS. 1 and 2, a signal y(t) is received ED by a radio receiver 1 comprising one or more antennae 2.

The composite signal y(t) received is a single signal or a mixture of several signals contained in a frequency band and expressed temporally as follows:

$$y(t) = \sum_{u=1}^{N_u} a_u(t) \cdot e^{j \cdot (2\pi \cdot f_u(t) \cdot t + \phi_u)} \cdot \sum_{k=1}^{N} s_u(k) \cdot h_u\left(t - \frac{k}{R_u(t)} - \tau_u\right) + \omega(t)$$

With
- ω: the additive Gaussian white noise;
- $N_u$: the number of signals contained in the considered frequency band;
- $a_u$: the amplitude of the signal u;
- $f_u$: the carrier frequency of the signal u;
- $\phi_u$: the phase at the origin of the signal u;
- $s_u$: the symbols sent by the sender u;
- $R_u$: the symbol rhythms of the sender u;
- $\tau_u$: the initial delay of the signal u;
- $h_u$: the shaping filter of the signal u.

The aim of the method is to estimate the parameters constituting each signal present in the considered frequency band. For an index signal u, particular interest is on its rhythm $R_u$, its offset of carrier frequency $f_u$, its amplitude $a_u$, its constellation $C_u$ from where the symbols $s_u$ originate and optionally its filter for shaping the pulse $h_u$.

In a first step, the composite signal y(t) is digitized E1 via a classic receipt chain. Such a receipt chain classically comprises a radio-frequency filter associated with a low-noise amplifier, followed by a mixer allowing passage of bandwidth comprising the band of interest to base band, and finally a sampler. This produces a sampled signal y(n) where n represents a sample index. y(n) is especially defined by:

$$y(n) = \sum_{u=1}^{N_u} a_u(n) \cdot e^{j(2\pi \cdot f'_u(n) \cdot n - \phi_u)} \cdot \sum_{k=1}^{N} s_u(k) \cdot h_u\left(n - \frac{k}{R_u(n)} - \tau_u\right) + \omega(n)$$

with $f'_u$ corresponding to the standardized residual carrier frequency of the signal u.

To make for easier later processings, the digitized signal y(n) is optionally pre-processed E2 in a second step.

This pre-processing E2 comprises a sub-step of centering and standardization E21. This pre-processing E2 produces a signal $y_{cn}(n)$ such that its spectral density of power is centred in 0 and such that:

$$\sum_{u=1}^{N_u} \bar{a}_u^2 = 1, \text{ with } \bar{a}_u = \frac{1}{N}\sum_{n=1}^{N} a_u(n).$$

This sub-step is optionally conducted from the estimation E23 of the level of noise $\sigma_\omega^2$ contained in the mixture, and optionally, for each signal of the mixture, of its useful band $B_u$, these parameters being possibly estimated E23 by means of determination E22 of the spectral density of power of the signal y(n). This is authorised by detection of the signal-to-noise ratio. The spectral density of power also determines the useful frequency band and the central frequency of this band, as explained in document [Proakis, 2007].

Very generally, for different values of L taken in a set $\{L_1, \ldots L_q\}$ of q (q strictly positive) strictly positive real numbers which calculates the function of spectral correlation defined hereinbelow are determined in a third step E3:

$$LSCF_y(f, \alpha) \triangleq \sqrt[L]{|\mathcal{F}_\tau[R_{y^L}(\tau, \alpha)](f)|}$$

where $$R_{y^L}(\tau, \alpha) = \frac{1}{N}\sum_{n=0}^{N} y^L(n)y^{*L}(n-\tau)e^{-j2\pi\alpha n}$$

is the cyclic autocorrelation function (CAF) of the sampled signal y(n) raised to the power L which will have optionally been standardized and centred, where $F_\tau[.]$ is the Fourier transform and where, for each q, α can independently take one or more discrete values and/or pass through one or more ranges of values.

In particular, a third simplified step E3 consists of first considering a zero cyclic frequency α. In this way, for M, a strictly positive real number taken in a set of q (q strictly positive) predetermined values $\{M_1, \ldots M_q\}$, this presupposes calculating the spectral function:

$$MPT_y(f) \triangleq \sqrt[M]{|\mathcal{F}_\tau[r_{yM}(\tau)](f)|},$$

where $r_{yM}(\tau)$ is the autocorrelation function of elevation to the power M of the signal sampled y(n) which will have optionally been standardized and centred earlier. As a function of the results obtained, analysis can be completed by limited calculation of functions LSCFy(f,α≠0) using just one pertinent subset of values of L of those M used during the third step.

The orders of spectral transformations M or L considered dependent on the possible modulations in the mixture, typically M=L=2, 4, or 8 are sufficient to correctly characterize the parameters of the different signals for current modulations such as BPSK, QPSK, OQPSK, 8-QAM, 16-QAM, 8-PSK, 16-APSK, 32-APSK.

Next, in a fourth step, each transformation LSCFy(f,α) obtained for each value of L taken in the set $\{L_1, \ldots L_q\}$ is processed E4 to extract therefrom triplets $\{LAp_i, LFp_i, L\alpha p_i\}$ designating its peaks $p_i$ according to both variables f and α where $LAp_i$ is the amplitude of the peak, $LFp_i$ the frequency f where it is located and $L\alpha p_i$ the cyclic frequency α in which it appears.

When discrete values of α are employed for some values of L, with each considered value of α the peaks are detected only according to the single variable f and it follows that $L\alpha p_i$ equals α. In particular, when the transformation MPTy (f) alone is used for M taken in $\{M_1, \ldots M_q\}$, these triplets all have a zero value α, they can therefore be reduced to a single couple $\{MAp_i, MFp_i\}$.

It is considered that a peak is present as soon as the spectral function has a local maximum, valid over an interval by a width which, according to executions, can be determined in advance or adaptively, a maximum of which the amplitude is greater than or equal to a threshold which, according to executions, can also be determined in advance or adaptively. For example, the value of the threshold can be selected as a function of the number of samples considered and/or of the estimated level of noise in the mixture.

It is seen that the functions LSCFy(f) and MPTy(f) are extracted by a Lth or Mth root of the module of the Fourier transform. The use of another power of the Fourier transform, or even of its logarithm or any monotonous function on the real positive numbers, provides the same peak positions with amplitudes modified respectively by the function employed. It is therefore possible to use these alternative formulas to extract the triplets.

Once the different triplets are obtained, in a fifth step E5 the groups of triplets $\{LAp_i, LFp_i, L\alpha p_i\}$ are identified, observed as characteristic signatures left by the presence of some types of signals in the considered frequency band, that is, these groups of peaks located at particular frequencies follow an amplitude profile as a function of the order L which is characteristic of the parameters constituting the mixture: in particular, this set of signatures can indicate that the power and/or the carrier frequency and/or the symbol rhythm and/or the type of modulation of signals present in the mixture as well as their number.

By way of convention, it will be considered that the signal of interest is that having the greatest amplitude. It will be clear however that some applications focus more on signals which would be masked by one or more signals using the same frequential resource but with more power.

In particular, in light of estimating the modulations and amplitudes of each of the signals, it is possible to use different recognition algorithms of the most probable signatures:

an algorithm for classification of peaks appearing in several transformations at frequencies connected to each other by a simple relationship (identical, harmonic or evenly spaced) and having for comparison reference a database of signatures set up previously.

or an optimisation algorithm based on analytical formulas giving the theoretical amplitude and the relationship of position of the peaks of a signature. In this case, the amplitudes and modulations of the signals are estimated conjointly in the form of the following optimisation problem:

$$\{\hat{C}_1, \ldots, \hat{C}_{N_u}, \hat{a}_1, \ldots, \hat{a}_{N_u}\} = \mathrm{argmax}_{\{C_1, \ldots, C_{N_u}, a_1, \ldots, a_{N_u}\}} \kappa,$$

where $\kappa$ is a function of strictly monotonous cost according to the probability of the set $\{C_s, \ldots, C_{N_u}, \alpha_1, \ldots, \alpha_{N_u}\}$ of assumptions being given of couples $\{MAp_i, MFp_i\}$ or of triplets $\{LAp_i, LFp_i, L\alpha p_i\}$ observed, and $\{\hat{C}_1, \ldots, \hat{C}_{N_u}, \hat{\alpha}_1, \ldots, \hat{\alpha}_{N_u}\}$ is the set of estimated modulations and amplitudes;

or even, when only the modulations are to be estimated, an algorithm based on the minimisation of the MSE (Mean-Squared Error) between the different triplets $\{LAp_i, LFp_i, L\alpha p_i\}$ or couples $\{MAp_i, MFp_i\}$ obtained from the signal y(n), and the basis of signatures previously set up from theoretical or experimental values:

$$\{\hat{C}_1, \ldots, \hat{C}_{N_u}\} = \min_{C_1, \ldots, C_{N_u}} \|\Pi - \Pi_{ref}^{C_1, \ldots, C_2}\|_2$$

where $\{\hat{C}_1, \ldots, \hat{C}_{N_u}\}$ represents the set of modulations estimated for the $N_u$ signals present in the considered frequency band, $$\Pi_{ref}^{C_1, \ldots, C_{N_u}}$$

represents the basis of references of signatures, that is, the values of triplets $\{LAp_i, LFp_i, L\alpha p_i\}$ set up previously for different values of parameters constituting the considered modulations as assumption $\{C_1, \ldots, C_{N_u}\}$ and $\Pi$ represents the set of values of triplets $\{LAp_i, LFp_i, L\alpha p_i\}$ obtained from the signal y(n).

Similarly, the residual carrier frequencies and the average symbol rhythms are estimated by means of a method based on observation of the set of values and $LFp_i$ (respectively $MFp_i$). Conjointly, the number of signals $N_u$ is optionally determined.

REFERENCES

[Guenther, 2010]: Guenther, B. (2010). Multi-User Signal Classification Via Cyclic (MsC Thesis);
[Mazo, 1978]: Mazo, J. (1978). Jitter Comparison of Tones Generated by Squaring and by Fourth-Power Circuits. *The Bell System Technical Journal;*
[Proakis, 2007]: Proakis, J. (2007). *Digital Communications 5th Edition.* McGraw-Hill Education;
[Reichert Reichert, 1992]: J. (1992). Automatic Classification of Communication Signal using Higher Order Statistics. *IEEE International Conference on Speech, Acoustics and Signal Processing;*
[Swami Et Sadler, 2000]: Swami, A., Et Sadler, B. (2000). Hierarchical digital modulation classification using cumulants. *IEEE Transactions on Communications;*
[Zaerin Et Seyfe]: Zaerin, M., Et Seyfe, B. (2012). Multiuser modulation classification based on cumulants in additive white Galsoan noise channel. *IET Signal Processing;*
[Ramkumar, 2009]: Ramkumar (2009) Automatic Modulation Classification for Cognitive Radios using cyclic feature detection, *IEEE Circuits and Systems Magazine,* vol. 9, No. 2, 1 April it 2009;
[Wu, 2012]: Zhikiang Wu et al. (2012), Blind Cyclostationary Carrier Frequency and symbol rate estimation for underwater acoustic communication", IEEE International Conference on Communication, pages 3482-3486;
[Rebeiz, 2011]: Reibeiz et al. (2011), Low Complexity Feature-based Modulation Classifier and its Non-asymptotic analysis, IEEE Global Telecommunications Conference, 5 Dec. 2011, pages 1-5.

The invention claimed is:

1. A method for estimation of parameters of a single signal or mixture of signals in a given frequency band, the method comprising the following steps:

receiving the single signal or the mixture of signals y(t) in the given frequency band;

determining for L, strictly positive real number taken in a set of q, q strictly positive, predetermined values $\{L_1; \ldots; L_q\}$ of the function of spectral correlation defined hereinbelow:

$$LSCF_y(f, \alpha) \triangleq \sqrt[L]{|\mathcal{F}_\tau[R_{y^L}(\tau, \alpha)](f)|}$$

$$\text{where } R_{y^L}(\tau, \alpha) = \frac{1}{N}\sum_{n=0}^{N} y^L(n)y^{*L}(n-\tau)e^{-j2\pi\alpha n}$$

is the cyclic autocorrelation function of elevation to the power L of the sampled version y(n) of the signal y(t) and where F$\tau$[•] is the Fourier transform and where, for each q, $\alpha$ can independently assume one or more discrete values and/or pass through one or more ranges of values;

processing of each transformation LSCFy(f, $\alpha$) L being taken in a set of q, q strictly positive, predetermined values $\{L_1; \ldots; L_q\}$ to extract therefrom a set of peaks $P_i$, that is, local maxima detected according to the variables f and α or according to the sole variable f for each discrete value of α, each of these peaks being characterized by a triplet {$LAp_i$, $LFp_i$, $Lαp_i$} where $LFp_i$ and $Lαp_i$ are respectively frequency and cyclic frequency at which it is located and $LAp_i$ its amplitude;

identifying groups of triplets {$LAp_i$, $LFp_i$, $Lαp_i$} as being signature left by a set of parameters constituting signals present in the given frequency band.

2. The estimation method according to claim 1, wherein the determining step is conducted initially by considering cyclic frequency α as being the zero discrete value for identifying groups of triplets {$LAp_i$, $LFp_i$, 0}, and secondly, by selecting a set of values of the order L and of discrete values or ranges of variation of α≠0 determined as a function of the results of first application of the method.

3. The method according to claim 1, wherein the Lth root of module of the Fourier transform is replaced in the formulas of spectral transformations by any other power or a logarithm or any other real monotonous function of the module of the Fourier transform.

4. The estimation method according to claim 1, also comprising pre-processing of the signal received comprising the following sub-steps:

determining a spectral density of power of y(n);

processing of the spectral density of power for estimating a level of noise contained in the mixture of signals;

processing of standardization and centring of the mixture of signals from previously obtained characteristics, determination of functions LSCF for some values of L taken in {$L_1$, ... $L_q$}, being based on the standardized and centred mixture of the signals.

5. The estimation method according to claim 1, wherein the identifying step comprises a comparison step of groups of triplets {$LAp_i$, $LFp_i$, $Lap_i$} obtained at signatures predetermined in advance, that is, triplets corresponding to a set of assumptions of parameters constituting the signals present in the mixture.

6. The estimation method according to claim 1, wherein the identifying step allows estimation of the modulations and of amplitudes of signals by executing an algorithm for classification of the peaks according to the frequency at which they are located, then a search by calculation of parameters constituting the mixture creating signatures resembling the groups formed in this way.

7. The estimation method according to claim 1, wherein estimating the modulations and amplitudes of the mixture of signals executes an algorithm searching for maximum probability of peaks obtained using analytical models of signatures and probability of spreads observed.

8. The estimation method according to claim 1, wherein the estimation of modulations of each of the signals executes an algorithm which searches for a minimum Mean-Squared Error (MSE) between the different triplets or couples and a database of signatures previously set up from theoretical or experimental values.

9. The estimation method according to claim 1, wherein the values of L are selected as a function of modulations present in standards of considered telecommunications.

10. The estimation method according to claim 1, wherein the identifying step allows estimation of residual carrier frequencies and symbol rhythms from the values $LFp_i$.

11. The estimation method according to claim 1, wherein the identification allows estimation of a number of signals $N_u$ from the values $LFp_i$.

* * * * *